US006825884B1

(12) United States Patent
Horiuchi

(10) Patent No.: US 6,825,884 B1
(45) Date of Patent: Nov. 30, 2004

(54) IMAGING PROCESSING APPARATUS FOR GENERATING A WIDE DYNAMIC RANGE IMAGE

(75) Inventor: Kazuhito Horiuchi, Hachioji (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 09/451,043

(22) Filed: Nov. 30, 1999

(30) Foreign Application Priority Data

Dec. 3, 1998 (JP) .......................................... 10-344665

(51) Int. Cl.[7] .............................................. H04N 5/235
(52) U.S. Cl. ..................... 348/362; 348/222.1; 358/521
(58) Field of Search .......................... 348/207.99, 218.1, 348/219.1, 221.1, 222.1, 229.1, 254, 255, 241, 362, 364, 256, 297; 358/518, 519, 520, 521, 450, 453, 433

(56) References Cited

U.S. PATENT DOCUMENTS

| | | | | | |
|---|---|---|---|---|---|
| 5,412,424 | A | * | 5/1995 | Ejima et al. ................. | 348/252 |
| 5,818,977 | A | * | 10/1998 | Tansley ....................... | 382/294 |
| 5,828,793 | A | * | 10/1998 | Mann .......................... | 382/284 |
| 6,040,860 | A | * | 3/2000 | Tamura et al. ............... | 348/252 |
| 6,219,097 | B1 | * | 4/2001 | Kamishima et al. ......... | 348/297 |
| 6,486,915 | B2 | * | 11/2002 | Bell et al. .................... | 348/362 |

FOREIGN PATENT DOCUMENTS

JP          5-314253          11/1993

* cited by examiner

Primary Examiner—Tuan Ho
(74) Attorney, Agent, or Firm—Ostrolenk, Faber, Gerb & Soffen, LLP

(57) ABSTRACT

An image processing apparatus for generating a wide dynamic range image to enable contrast to be maintained in low luminance image areas and high luminance image areas when the image is displayed by a narrow density range display system having: an image data buffer in which short-time exposure image data is stored; an image area segmenting circuit for fractionating long-time exposure image data into areas of proper and improper exposure; a segmented area image information extracting circuit for segmenting the properly exposed area of the long-time exposure image data on the basis of the segmented information and segmenting the improperly exposed area as a properly exposed area by applying the short-time exposure image data; a gradation correcting circuit for gradation-correcting image data in the properly exposed areas of the long-time exposure and the short-time exposure images which have been segmented by the segmented area image information extracting means, respectively; and an image synthesizer for synthesizing the properly exposed areas after gradation correction to form a composite wide dynamic range image.

8 Claims, 16 Drawing Sheets

FIG.7A

| 1 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 16 | 16 | 1 | 1 | 1 |
| 1 | 1 | 1 | 16 | 16 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

WEIGHTING IN VIEW
OF ONLY CENTRAL PORTION

FIG.7B

| 1 | 2 | 4 | 8 | 8 | 4 | 2 | 1 |
|---|---|---|---|---|---|---|---|
| 2 | 4 | 8 | 16 | 16 | 8 | 4 | 2 |
| 4 | 8 | 16 | 32 | 32 | 16 | 8 | 4 |
| 8 | 16 | 32 | 64 | 64 | 32 | 16 | 8 |
| 8 | 16 | 32 | 64 | 64 | 32 | 16 | 8 |
| 4 | 8 | 16 | 32 | 32 | 16 | 8 | 4 |
| 2 | 4 | 8 | 16 | 16 | 8 | 4 | 2 |
| 1 | 2 | 4 | 8 | 8 | 4 | 2 | 1 |

WEIGHTING BY CENTRALIZATION
WITH RADIAL EXTENT

LUMINANCE SIGNAL

EDGE OF LUMINANCE SIGNAL

SETTING OF THRESHOLD VALUE
FROM HISTOGRAM OF FIG.12B

FORMATION OF LUMINANCE
HISTOGRAM FROM FIGS.12A AND 12C

FORMATION OF TARGET
HISTOGRAM FROM FIG.12D

FORMATION OF CONVERTING
CURVE FROM FIGS.12D AND 12E

IMAGING PROCESSING APPARATUS FOR GENERATING A WIDE DYNAMIC RANGE IMAGE

BACKGROUND OF THE INVENTION

1. Field of the Invention

The present invention relates to an image processing apparatus, more particularly, to an image processing apparatus for generating one wide dynamic range image from a plurality of images photographed under different exposure conditions.

2. Related Art Statement

Conventionally, there have been proposed various image processing apparatuses for synthesizing a plurality of images photographed under different exposure conditions, thereby generating an image having a wide dynamic range. However, when an image having wide dynamic range synthesized by the image processing apparatus is displayed on a monitor or a printer whose density range is relatively narrow, the dynamic range is compressed.

Generally, the compression of the dynamic range is executed in accordance with characteristics pursuant to a normal γ-characteristic (similar to a logarithmic characteristic) so as to prevent, as much as possible, the contrast in a main object to be photographed and the background from being degraded.

Japanese Unexamined Patent Publication No. 5-314253 disclosed as an example of the above-described technique, in which the compression for high luminance areas is executed in accordance with a characteristic proportional to the logarithm of luminance, and the compression for low luminance areas is executed in accordance with a characteristic almost proportional to the luminance.

An example of known dynamic range compression is illustrated in FIG. 16.

In this example, that a wide dynamic range image is formed on the basis of a short-time exposure signal SIGSE and a long-time exposure signal SIGLE for which the exposure ratio is 1 to 8.

In this instance, if α denotes the incident light level at which the long-time exposure signal SIGLE reaches saturation (100%), it is possible to obtain an incident light level 8α at which the short-time exposure signal SIGSE reaches the saturation.

First, the output level of the short-time exposure signal SIGSE is increased by eight times and then the short-time exposure signal SIGSE is combined with the foregoing long-time exposed signal SIGLE to form a wide dynamic range signal SIGWDR.

Next, to display the wide dynamic range signal SIGWDR on a monitor, a printer, or the like whose density range is narrow, the output level is compressed proportionally to the incident light level in the low output level portion of SIGWDR and logarithmically to the incident light level in high output level portion of SIGWDR, thereby finally obtaining a corrected signal SIGLST.

With the compression characteristics described above, the contrast of the wide dynamic range image is nearly preserved in the low luminance areas, but is reduced in the higher luminance area because the saturation effect causes smaller changes of the output level as the luminance continues to increase.

In a typical photograph, a main object of interest is not necessarily in the low luminance area. For example, if a person is photographed against a dark scene using a strobe, the area around the person will exhibit a relatively high luminance. With the conventional compression technique, the contrast of the person will be degraded and a flat or dull image will result.

According to the foregoing conventional technique, the same compression characteristic is used irrespective of image features such as edge and luminance distribution. The result may be an image having wide dynamic range but low image quality.

OBJECT AND SUMMARY OF THE INVENTION

It is an object of the present invention to provide an image processing apparatus in which contrast can be maintained throughout the entire luminance range of the image, even if the dynamic range is compressed to permit a display system having a narrow density range.

According to the present invention, there is provided an image processing apparatus for generating a single wide dynamic range image by processing a plurality of images photographed under different exposure conditions comprising: an image correcting circuit for correcting gradation of the images in the image group; and an image synthesizing circuit for combining the gradation corrected images and generating a single wide dynamic range image.

Further, according to the present invention, there is provided an image processing apparatus for generating a wide dynamic range image by processing a plurality of images photographed under different exposure conditions comprising: a segmenting circuit for segmenting each image into a properly exposed area and an improperly exposed area on the basis of a predetermined image signal level; an image correcting circuit for correcting gradation of only the properly exposed areas of the images; and an image synthesizer for synthesizing the properly exposed areas of the gradation-corrected images and generating a single wide dynamic range image.

The objects and advantages of the present invention will become further apparent from the following detailed explanation.

BRIEF DESCRIPTION OF THE DRAWINGS

FIG. 7A is a diagram showing an example in case of weighting in view of only the central portion in an image when calculating a cumulative edge histogram in an edge histogram calculating circuit according to the first embodiment;

FIG. 7B is a diagram showing an example in case of weighting smoothly toward the peripheral portion while setting the central portion in an image as a center when calculating a cumulative edge histogram in an edge histogram calculating circuit according to the first embodiment;

DETAILED DESCRIPTION OF THE PREFERRED EMBODIMENTS

Embodiments of the present invention will be described hereinbelow with reference to drawings.

Figure 1:
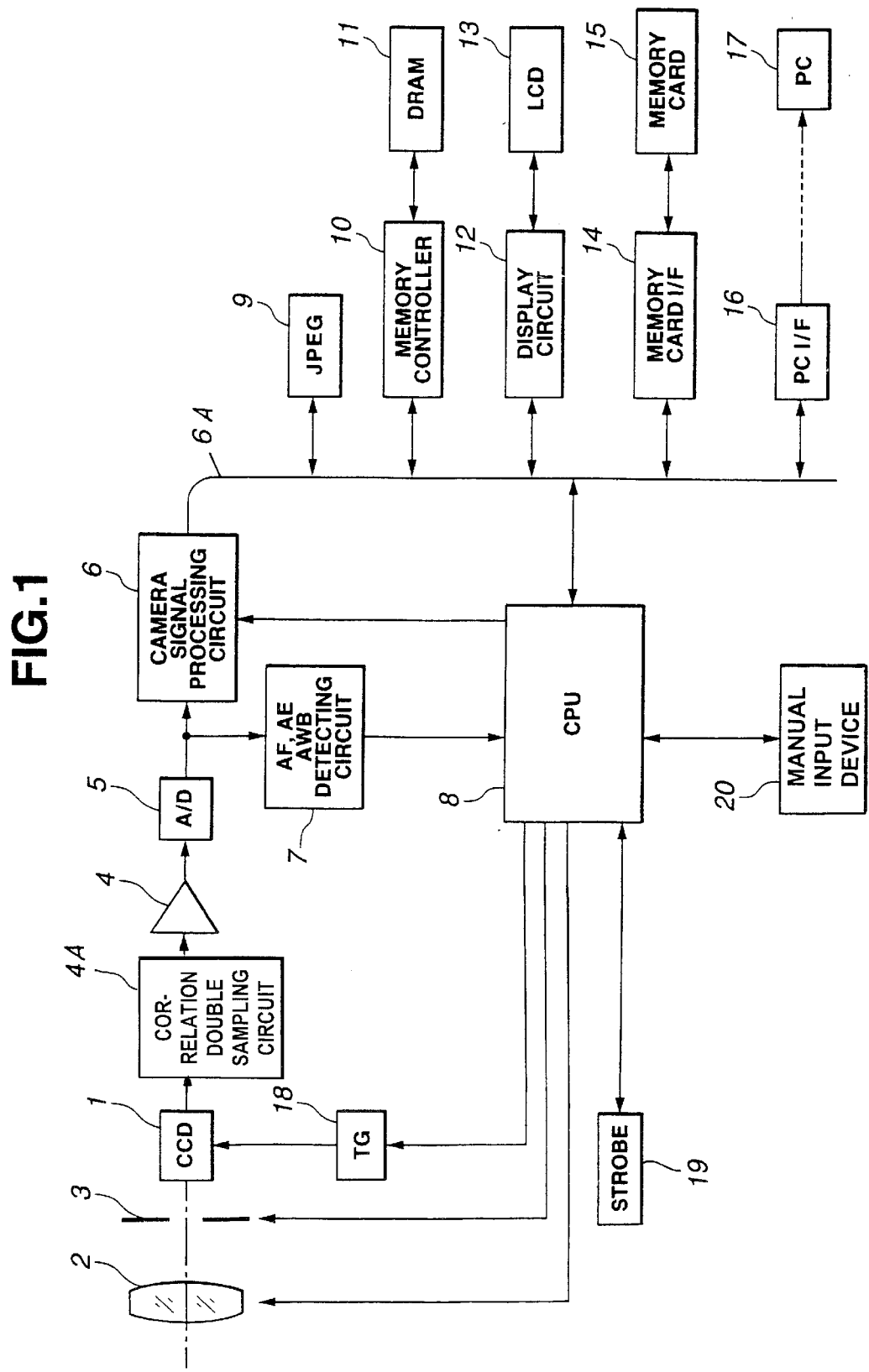
FIG. 1 is a block diagram showing a fundamental construction of an electric camera according to the first embodiment of the present invention.

FIGS. 1 to 9 show the first embodiment of the present invention. FIG. 1 is a block diagram showing a fundamental construction of an electric camera.

The electric camera according to the invention is comprised of an optical system including a lens 2 and an electric aperture/shutter mechanism 3, an opto-electric image converter 1 such as a CCD for converting the image focused by lens 2 into an electrical image signal, and various signal processing circuits described below, all under control of a CPU 8.

The signal processing circuits include a noise filter 4A, such as a correlation double sampling circuit, coupled to the output of image converter 1, an amplifier 4 connected to the output of filter 4A, and an A/D converter 5 for digitizing the image signal output of amplifier 4. Connected to the output of A/D converter 5 are a camera signal processor 6, and an AF/AE/AWB detecting circuit 7 for detecting AF (auto focusing) information, AE (auto exposure) information, and AWB (auto white balance) information in the digital output of A/D converter 5.

For simplicity, only a single image converter, amplifier. etc., are shown and described. As will be appreciated by those skilled in the art, however, for color photography, separate processing of signals for a plurality of colors is necessary. This may be achieved in any conventional or desired manner, for example, by use of red, green and blue color filters positioned between shutter 3 and separate image converters for each filter.

The output of camera processing circuit 6 is connected to a signal bus 6A. Also connected to signal bus 6A are a compressing circuit (JPEG) 9 for compressing the image data from the camera signal processing circuit 6; a memory card interface for controlling the recording of compressed image data on a memory card 15; a DRAM 11 used as working memory; a memory controller 10 for DRAM 11; a PC interface 16, for transferring the image data recorded on the memory card 15 to a personal computer (PC) 17; a display circuit 12 for controlling an LCD display 13, and CPU 8, previously mentioned. A strobe 19 is provided to illuminate the object to be photographed under control of CPU 8. A timing generator (TG) 18, also controlled by CPU 8, provides a timing pulse to drive the CCD. A manual input device 20, including a switch to set a variety of photographing modes and a trigger switch for initiating a photographing operation, etc., is also coupled to CPU 8.

A normal photographing mode and a wide dynamic range photographing mode are available. In the normal mode, one image is created and converted to an image data signal. In the wide dynamic range mode, a plurality of images under different exposures are photographed at close time-intervals and the images are combined, thereby obtaining a composite wide dynamic range image. The mode may be selected manually using input device 20. Alternatively, the CPU 8 the CPU 8 may automatically select the mode, e.g., by switching to the wide dynamic range mode if saturation of the image signal from the image converter 1 is detected.

In the normal mode,, CPU 8 controls shutter mechanism 3, and if needed, strobe 19 to produce a single optical image which is converted to an electrical image signal by image converter 1. For the wide dynamic range mode, CPU 8 controls shutter mechanism 3, image converter 1 and strobe 19 to produce two or more differently exposed images of the same scene and to produce corresponding separate image signals. The image data signals are then processed by camera signal processing circuit 6.

Figure 2:
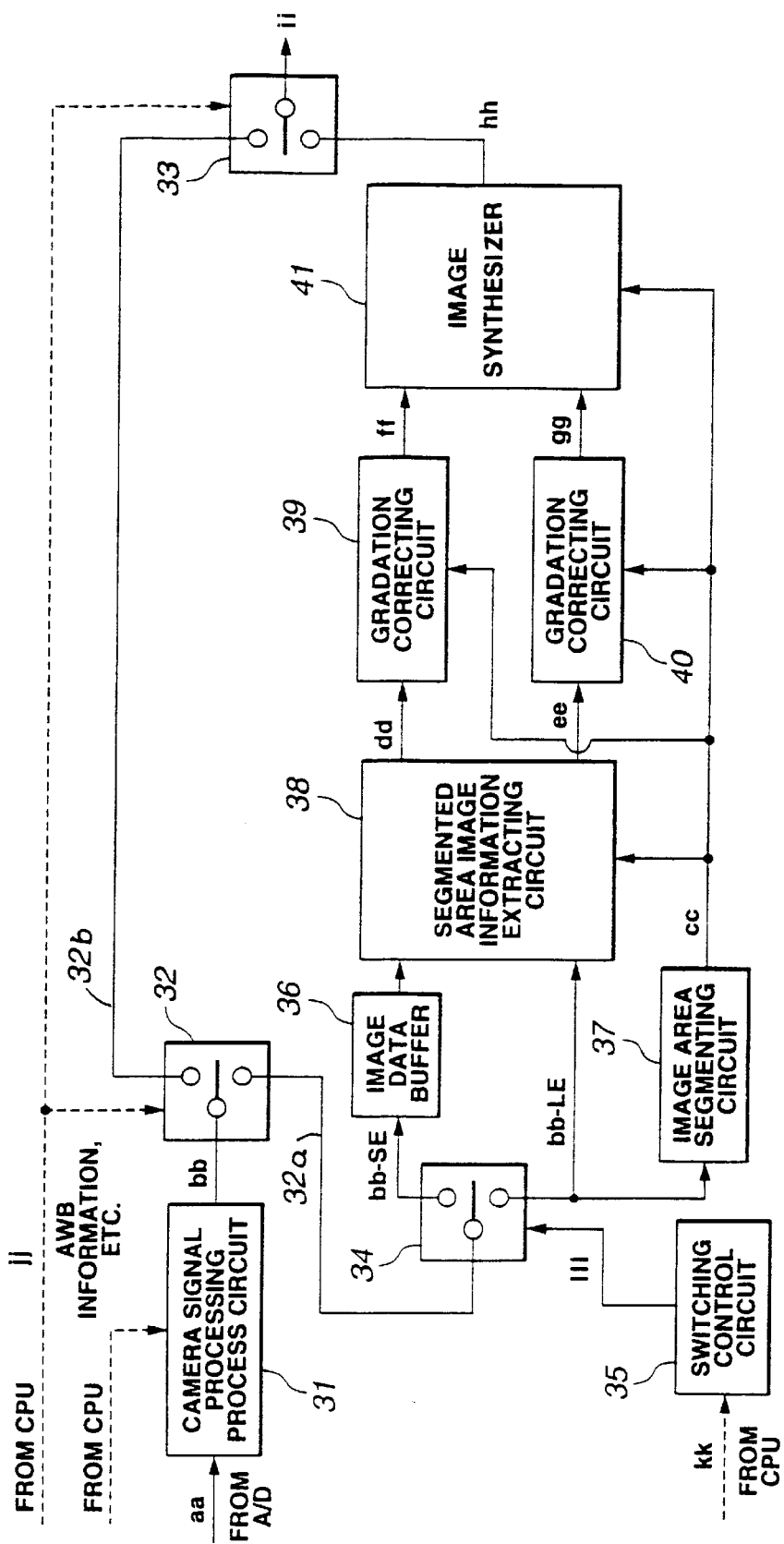
FIG. 2 is a block diagram showing a construction of a camera signal processing circuit according to the first embodiment.

FIG. 2 is a block diagram showing a suitable construction for camera signal processing circuit 6. This function to synthesize a composite image from a first short-time image exposure SE and a second long-time exposure image LE.

For purposes of description, it is assumed that the short-time exposure SE is first executed and, thereafter the long-time exposure LE is executed.

The camera signal processing circuit 6 comprises; a pre-processing input circuit 31 which receives an AWB information signal from the CPU 8 and a video signal "aa" from the A/D converter 5, and generates an image signal "bb"; a switch 32 for switching the output destination of image signal "bb"; on the basis of a signal "jj" from the CPU 8 indicative of whether the normal mode or wide dynamic range mode has been selected; and a second switch 34 which directs a signal 32a from switch 32 under control of a signal "lll" generated by a switching control circuit 35. This, in turn, receives a signal "kk" from CPU 8 which indicates if the signal "aa" received from A/D converter 5 is a short-time exposure signal SE or a long-time exposure signal LE. A short-time exposure signal "bb-SE" from switch 34 is coupled to an image data buffer 36 and from there to a segmented area image information extracting circuit 38. A long-time exposure signal "bb-LE" from switch 34 is coupled to an image area segmenting circuit 37 and also, directly to segmented area image information extracting circuit 38.

The operation of image area segmenting circuit 37, which segments the long-term exposure images and which will be described below.

The segmented area image information extracting circuit 38, serves as segmenting means for the short-time exposure image data SE which is read out from the image data buffer 36 and the long-time exposure image data LE from the switch 34 in response to a segmented area information signal "cc" from image area segmenting circuit 37. The extracted segmented image information is provided as a first output signal "dd" representing segmented short-time exposure signal data, and a second output signal "ee" representing segmented long-time exposure signal data. These signals are coupled respectively to gradation correction circuits 39 and 40, and the respective gradation-corrected image signals "ff" and "gg" are coupled to image synthesizer 41 which combines the separate corrected image component signals into a single composite image signal "hh" having the desired wide dynamic range.

Signal "hh" is connected to one input terminal of a switch 33. The other input terminal receives a signal 32b from switch 32. Switches 32 and 33 are controlled by a signal "jj" from CPU 8 which indicates whether the camera is in the normal mode or the wide dynamic range mode. The output signal "ii" coupled to bus 6A (see FIG. 1) for the normal mode is the signal 32b provided directly from switch 32, while in the wide dynamic range mode, output signal "ii" is signal "hh" generated by image synthesis processing circuit 41 as described above.

Figure 3:
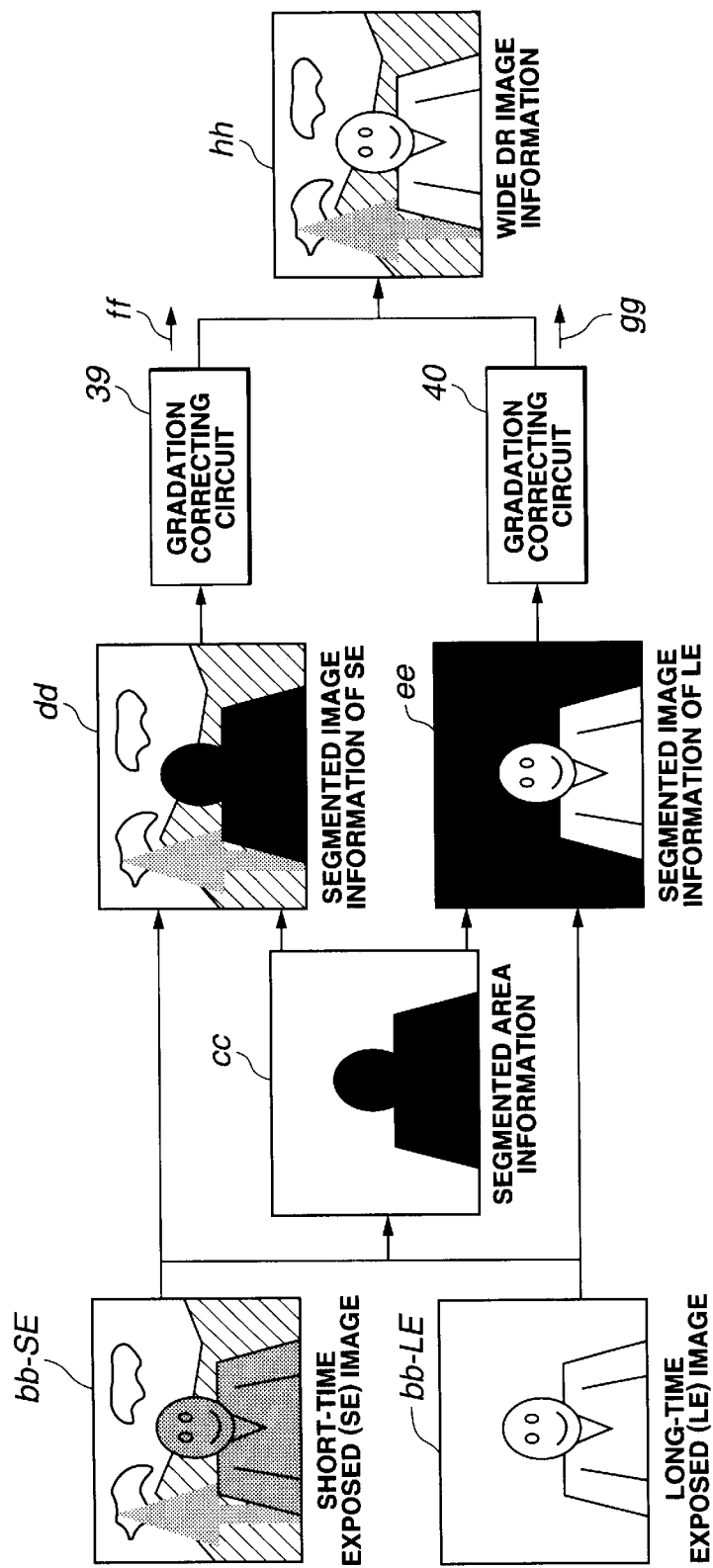
FIG. 3 is a diagram showing a state of a processing signal in the camera signal processing circuit according to the first embodiment.

FIG. 3 is a diagram showing a processing signal state in the camera signal processing circuit 6 for the wide dynamic range mode in the case of a back-lighted person photographed against a bright (high luminance) background.

For the short-time exposure SE, the exposure of the background is substantially correct, but, as shown by image "bb-SE", the person is under-exposed.

For the long-time exposure image LE, the background is saturated, but the portion of the image showing the person is properly exposed (see image bb-LE).

Using the image in which the main subject of the photograph is properly exposed (in this case, the person in image bb-LE), the image area segmenting circuit 37 generates a segmented area information signal "cc" identifying those pixies in the long-time exposed image which are in properly exposed areas, in improperly exposed areas and in areas for which the exposure level is intermediate between the proper exposure and the improper exposure.

Based on the segmented area information signal "cc", the segmented area image information extracting circuit 38 forms the segmented image information signal "dd" for the short-time exposure from the short-time exposure image signal bb-SE, and the segmented image information signal "ee" for the long-time exposure from the long-time exposure image signal bb-LE.

In the example shown in FIG. 3, background image information is extracted to form the segmented image information "dd" for the short-time exposure, and the portion of the image showing the person is extracted to form the segmented image information "ee" for the long-time exposure.

The segmented image information signals "dd" and "ee" are gradation-corrected separately by respective gradation correcting circuits 39 and 40. Then, gradation corrected segmented image information signals "ff" and "gg" are combined to form the wide dynamic range (DR) image information signal "hh", in which both the background and the person are properly exposed, by the image synthesis processing circuit 41.

Figure 4:
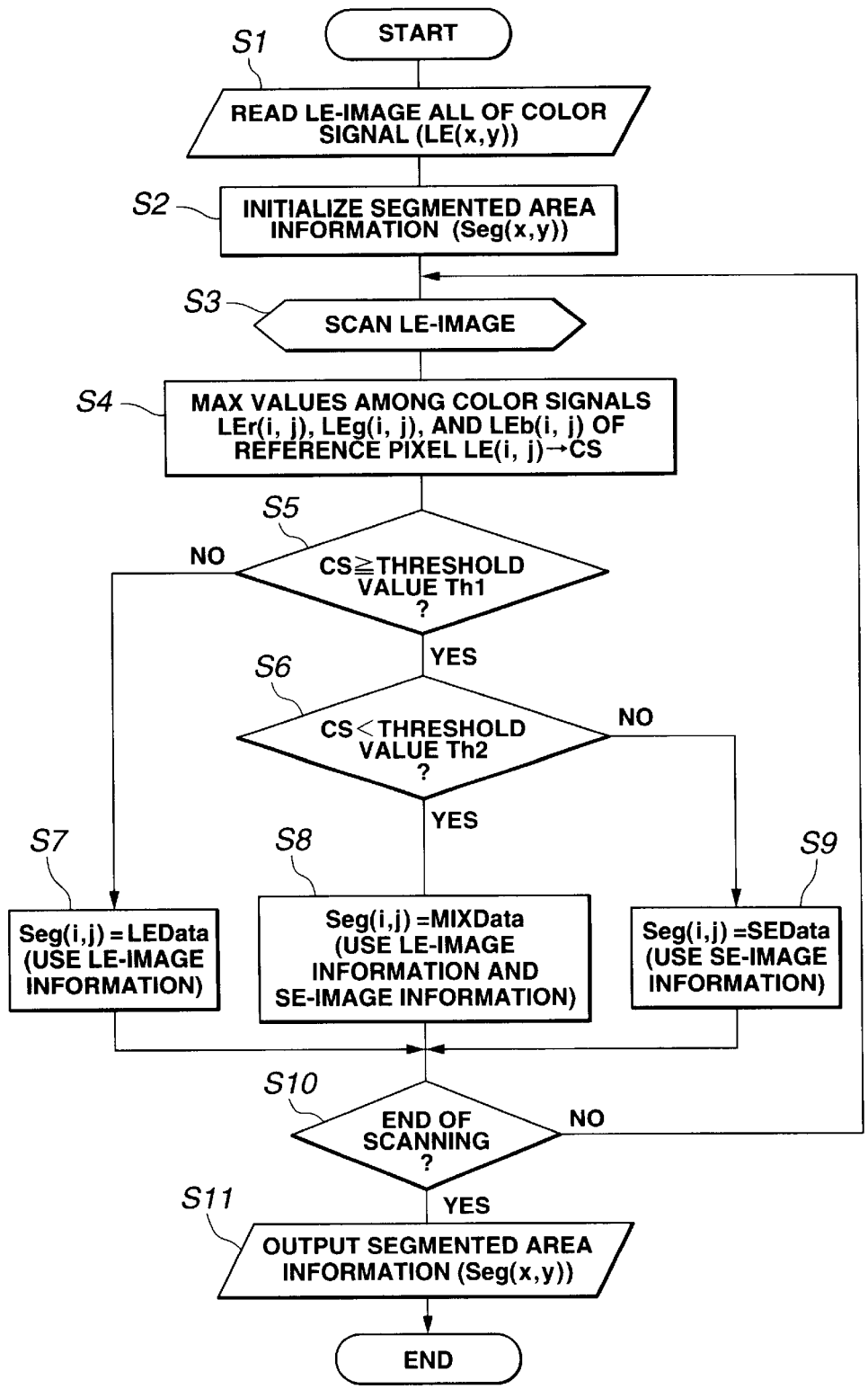
FIG. 4 is a flowchart showing a process in an image area segmenting circuit according to the first embodiment.

FIG. 4 is a flowchart showing an example of the process performed by image area segmenting circuit 37. In this example, the segmented area information "cc", is based on the long-time exposure image. However, the segmented area information may be generated on the basis of the short-time exposure image, or based on both images. Further, when forming the wide dynamic range image from three images or more, the segmented area information "cc" may be generated on the basis of one or more parts of each image.

As shown in FIG. 4, a first step is to read all of color signal data LE(x,y) for the long-time exposure image LE provided by image converter 1 (step S1).

Separate color signals LEr(x,y), LEg(x,y), and LEb(x,y) corresponding to red (r), green (g), and blue (b) image components are processed to form two-dimensional pixel arrays with x-y coordinates set to integer values. (In the description below, integers i and j are used to designate a specific (x,y) coordinate.)

Next, a 2-dimensional array Seg(x,y) to store the segmented area information is initialized (step S2).

The LE-image is scanned by sequentially incrementing the i and j values of the image signals LE(i,j) (step S3).

For each pixel of LE (i,j) read, a maximum value from among the color signals Ler(i,j), Leg(i,j), and Leb(i,j) is determined, and stored as a variable CS (step S4).

It is next determined whether the value stored in the variable CS is equal to a predetermined threshold value Th1 which represents an upper limit of the proper exposure (step S5). If the value stored in the variable CS is less than the value Th1 in step S5, the (i, j) pixel from the long-time exposure LE is used as the pixel value for the (i, j) coordinate stored into the segmented area information Seg(i,j) (step S7).

If it is determined that the value stored in the variable CS greater than or equal to the value Th1 in step S5, it is then determined if the variable CS is less than a predetermined threshold value Th2 (Th1<Th2) indicative of a lower limit of the improper exposure or not (step S6). If variable CS is not less than the value Th2 in step S6, the (i, j) pixel from the short-time exposure SE is used as pixel data value for the (i, j) coordinate stored into the segmented area information Seg(i,j) (step S9).

If it is determined that the variable CS is less than the value Th2 in step S6, the exposed state is intermediate between the proper exposure and the improper exposure, and a value MIXData indicative of information such that the (i, j) pixies from both the long-time exposure LE data and the short-time exposure SE data are used as the pixel data for the (i, j) coordinate stored into the segmented area information Seg(i,j) (step S8).

Thus, the image area segmenting circuit 37 functions as maximum color signal comparing means through steps S5 to S9.

If any one of steps S7 to S9 is finished, it is determined if the scanning throughout the whole the picture plane is finished or not (step S10). If scanning is not finished in step S10, the processing routine returns to step 33 and a next pixel is scanned. If it is determined that the scanning is finished instep S10, the segmented area information Seg(x, y) is outputted (step S11) and the processing routine is finished. The segmented area information Seg(x,y) which has been outputted becomes the signal as described as "cc", in the block diagram (FIG. 2).

Figure 5:
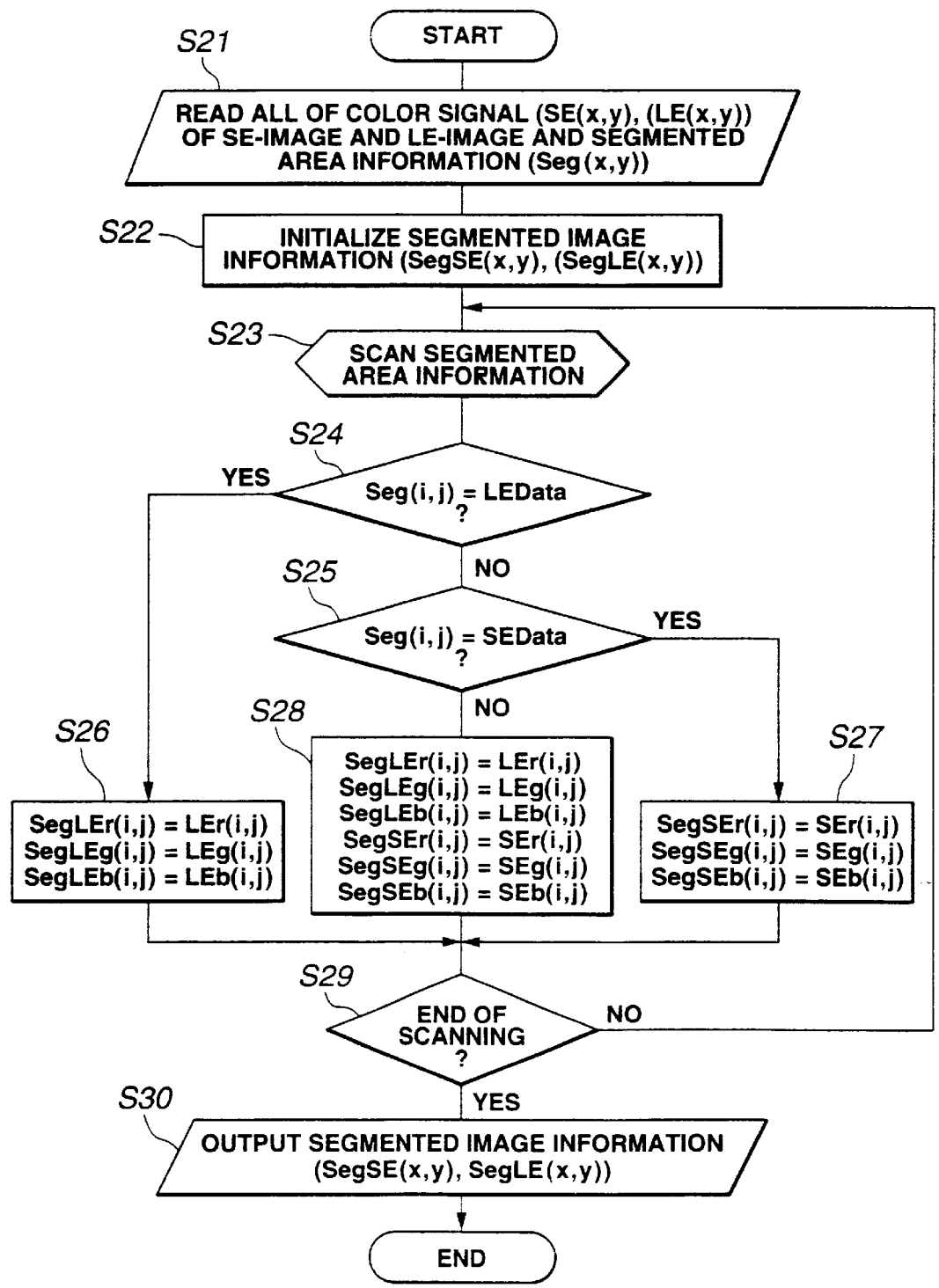
FIG. 5 is a flowchart showing a process in a segmented area image information extracting circuit according to the first embodiment.

FIG. 5 is a flowchart showing a process in the segmented area image information extracting circuit 38.

When the process is started, a first operation is to read the color image signal SE(x,y) of the short-time exposure SE read-out from the image data buffer 36, the color image signals LE(x,y) of the long-time exposure LE transmitted via the switch 34, and the segmented area information Seg(x,y) outputted from the image area segmenting circuit 37 (step S21).

Then, areas SegSE(x,y) and SegLE(x,y) for storing the segmented image information are initialized (step S22).

Next, the segmented area information read in step S21 is scanned (step S23), and it is first determined whether the segmented area information Seg(i,j) is LEData or not (step S24).

If it is determined that the segmented area information Seg(i,j) is LEData in step S24, values LE(i,j) of r-, g-, and b-colors are stored into the information SegLE(i,j) (step S26).

If it is determined that the segmented area information Seg(i,j) is not LEData in step S24, it is next discriminated whether the segmented area information Seg(i,j) is SEData or not (step S25). If it is determined that the segmented area information Seg(i,j) is SEData in step S25, values SE(i,j) of r-, g-, and b-colors are stored into the information SegSE(i,j) (step S27).

If it is determined that the segmented area information Seg(i,j) is not SEData in step S25, to obtain the MIXData, values LE(i,J) of r-, g-, and b-colors and the values SE(i,j) of r-, g-, and b-colors are both stored into the information SegSE(i,j) (step S28).

If any one of steps S26 to S28 is finished, it is discriminated whether the scanning throughout the whole the segmented area information is finished or not (step S29). If it is determined that the scanning is not finished in step S29, the processing routine returns to step S23 and a next segmented area information is scanned. If it is determined that the scanning is finished in step S29, the segmented image information SegSE(x,y) and SegLE(x,y) are outputted (step S30) and the processing routine is finished.

The segmented image information SegSE(x,y) which has been outputted in step S30 becomes the signal described as "dd" in the block diagram (FIG. 2). The segmented image information SegLE,(x,y) becomes the signal described as "ee" in the block diagram (FIG. 2)

Figure 6:
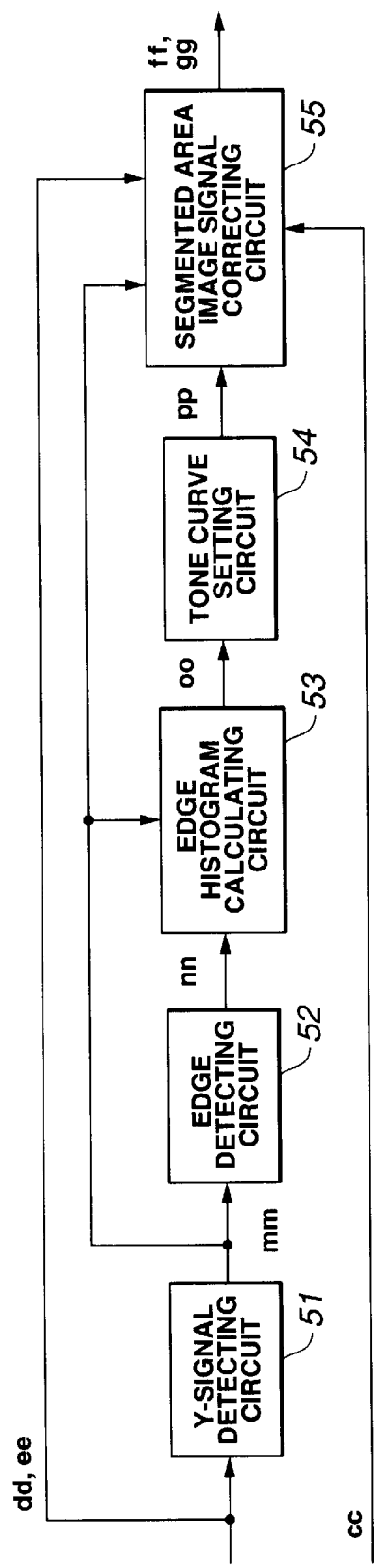
FIG. 6 is a block diagram showing a construction of a gradation correcting circuit according to the first embodiment.

FIG. 6 is a block diagram showing the construction of suitable gradation correcting circuits 39 and 40.

The gradation correcting circuits 39 and 40 each comprise: a Y-signal detecting circuit 51 for detecting a luminance signal (Y-signal) from the segmented image information dd or ee outputted from the segmented area image information extracting circuit 38; an edge detecting circuit 52, for detecting whether each pixel in the image represents an edge of an image component from a luminance signal mm outputted from the Y-signal detecting circuit 51; an edge histogram calculating circuit 53, for calculating an edge histogram indicative of the luminance level distribution of the pixels representing an image-component edge of pixels near the edge on the basis of an edge detecting signal nn of the edge detecting circuit 52 and the luminance signal mm; a tone curve setting circuit 54 which calculates a tone curve as gradation correcting characteristics on the basis of a cumulative edge histogram signal oo outputted from the edge histogram calculating circuit 53; and a segmented area image signal correcting circuit 55, which actually performs the gradation correction on the segmented image data dd and ee on the basis of tone curve characteristic signal pp outputted from the tone curve setting circuit 54, the luminance signal mm, and the segmented area information cc and outputting the segmented image information ff and gg after compensation.

The edge detecting circuit 52 is a circuit for performing a filtering by a general edge detecting operator such as Sobel. If the intensity detected by the edge operator is equal to a predetermined threshold value (for instance, maximum value within a range of the A/D converter 5) or more, it is determined that an edge exists at a reference position and the edge information is set to "EG". If the intensity by the edge operator is not equal to the predetermined threshold value (for instance, maximum value within the range of the A/D converter 5) or more, the edge information is set to "0". That is, binary information is outputted.

The gradation correction is performed by the circuits as shown in FIG. 6, so that the histogram is smoothed. In particular, in the case where the histogram of an original image is concentrated to a specific-value area, the contrast of the image can be therefore improved. According to the gradation correction, the image synthesis can be executed near the central portion in a density range of the wide dynamic range image to be generated by the image synthesis processing circuit 41 later on.

FIGS. 7A and 7B are diagrams showing examples in which weight is changed in accordance with a pixel position in an image in case of calculating the cumulative edge histogram in the edge histogram calculating circuit 53.

First, FIG. 7A indicates the example in which weighting is performed in view of only the central portion. For instance, when the edge exists at the peripheral portion, the pixel is counted as 1, and when the edge exists at the central portion, the pixel is counted as, for example, 16.

On the other hand, FIG. 7B indicates the example in which weighting is smoothly performed toward the peripheral portion while setting the central portion as a center. For instance, when pixels at the corner portions of four sides are the edges, the pixels are counted as 1, and when pixels at the central portion are the edges, the pixels are counted as, for example, 64. With regard to a pixel existing at the intermediate portion between them, as the pixel exists nearer the central portion, the pixel is counted as a higher value. As the pixel exists at more peripheral portion, the pixel is counted as a lower value.

Although square power weighting is executed for purpose of simplifying the calculating in both examples of FIGS. 7A and 7B, the invention is not, obviously, limited by the examples.

Figure 8A:
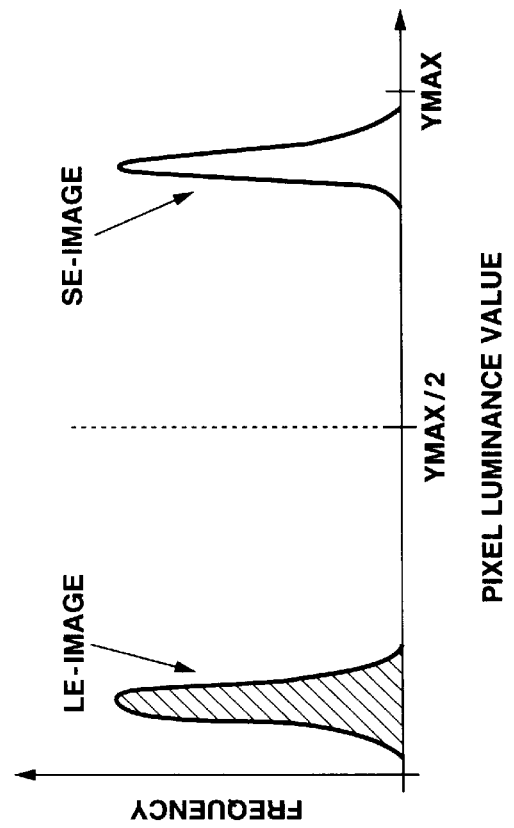
FIG. 8A is a histogram of a luminance signal in the case that luminances of an object to be photographed are separated to relatively light luminances and relatively dark luminances and both thereof are concentrated, respectively.
Figure 8B:
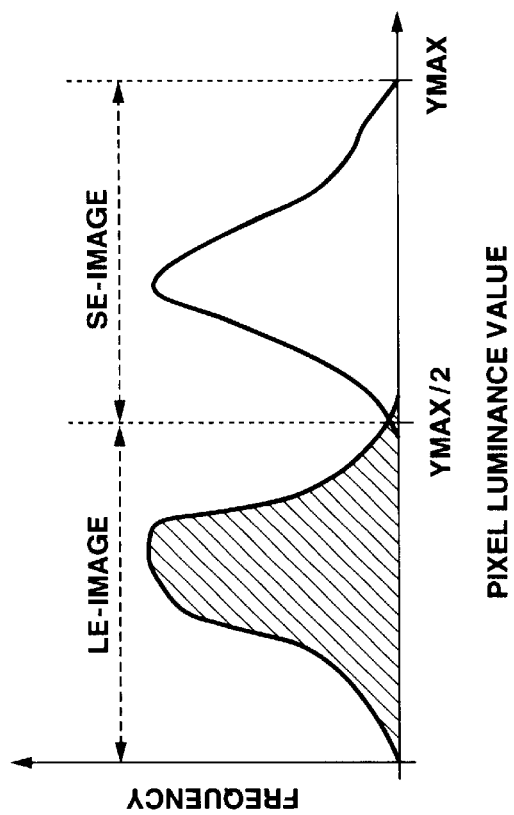
FIG. 8B is a histogram of a luminance signal in the case that gradation is corrected to synthesize images of the object in FIG. 8A near the central portion in the density range.

FIGS. 8A and 8B, show examples in which the gradation correction is executed so as to enable the images to be synthesized near the central portion in the density range of the wide dynamic range image to be formed by the image synthesis processing circuit 41.

FIG. 8A is a histogram of a luminance signal characterized mainly by areas of relatively high luminance and areas of relative low luminance. This could, for example, be the case of a main object in a relatively dark room with a window and, a relatively bright outside scene, in which both the object in the room and the background outside the window are desired to be reproduced. According to the invention, the histogram shown in FIG. 8A would be derived from the long-exposure image (LE) for the low-luminance portion of the image representing the main object, and from the short-exposure image (SE) for the high luminance portion of the image in the window.

The gradation correcting process by the gradation correcting circuits 39 and 40 is executed to broaden the luminance distribution of the images and to shift the overall distribution toward the central portion (YMAX/2) in the density range. FIG. 8B is a histogram of a luminance signal showing such a correction. Here, the dynamic range of each image is substantially enlarged. This allows the light and dark portions of the image to be properly reproduced on a printer or monitor with a limited dynamic range.

Figure 9:
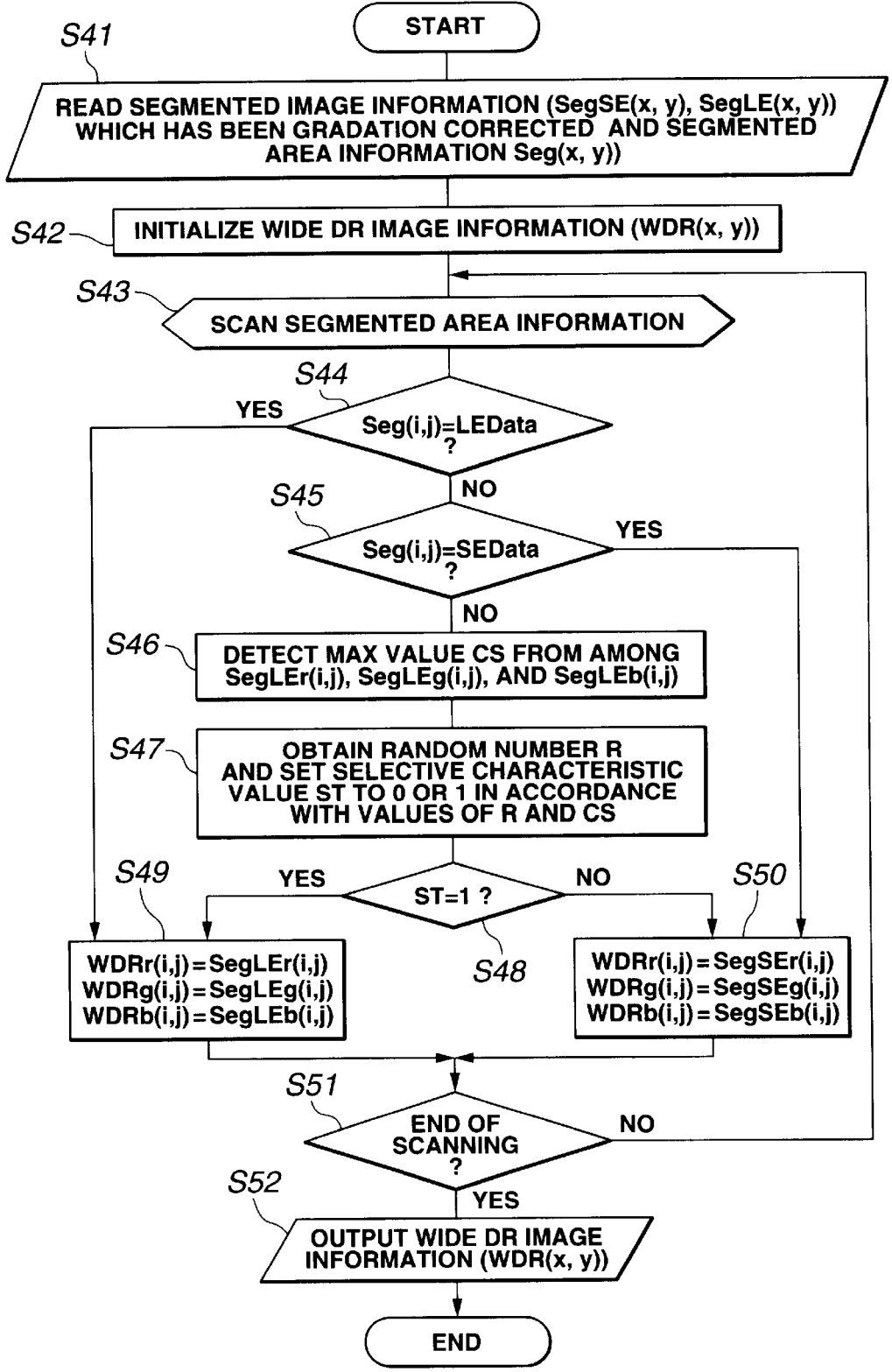
FIG. 9 is a flowchart showing a process in an image synthesis processing circuit according to the first embodiment.

FIG. 9 is a flowchart showing the image synthesis process executed by image-synthesizer 41. The first step is to read the segmented gradation-corrected image information SegSE(x,y) and SegLE(x,y) outputted from the gradation correcting circuits 39 and 40 and the segmented area information Seg(x,y) outputted from the image area segmenting circuit 37 (step S41).

Then, a memory area WDR(x,y) to store the wide dynamic range image information is initialized (step S42), and the segmented area information is scanned (step S43).

Next, it is determined whether the segmented area information Seg(i,j) is LEData or not (step S44). If the segmented area information Seg(i,j) is LEData, pixel color data of SegLE(i,j) is stored into the area WDR(i,j) (step 349).

If the segmented area information Seg(i,j) is not LEData in step S44, it is next determined whether the segmented area information Seg(i,j) is SEData or not (step S45). If the segmented area information Seg(i,j) is SEData, pixel color data of SegSE(i,j) is stored into the area WDR(i,j) (step 550).

If it is determined that the segmented area information Seg(i,j) is not SEData in step S45, then the pixel luminance value is in the MIXData range (i.e., between the threshold values Th1 and Th2 inn FIG. 4). In that case, a selection algorithm must be invoked to determine whether the long-exposure pixel data or the short-time exposure pixel data should be used in the composite image. This involves determining the maximum value CS of the color components SegLEr, SegLEg, and SegLEb of SegLE(i,j) (step S46), generation of a random number R, computing a value of Cst (CS) according to the relationship:

$$Cst(CS) = \frac{CS - Th1}{Th2 - Th1} \quad (Th1 \leq CS < Th2) \quad (1)$$

and finally setting a selection characteristic ST to a value of 0 or 1 in accordance with the random number R and the maximum CS value (step S47).

The function Cst (CS) increases monotonically from 0 to 1 within the defined range (Th1≦CS≦Th2), and may therefore be used to select between the segmented image information (SegLE (i,j) and SegSE(i,j) in accordance with the value of CS.

When the random number R has been generated, the maximum value RMAX thereof is multiplied by the function Cst(CS), the selection characteristic value ST is determined according to the relationship:

$$ST = \begin{cases} 0 & : Cst(CS) \times RMAX \geq R \\ 1 & : \text{Otherwize} \end{cases} \quad (2)$$

According to the expression 2, where the function Cst (CS) is small (a degree of saturation for the segmented image pixel SegLE(i,j) is relatively low and characteristics of the long-time exposure LE image remain preserved), ST strongly trends to be set to 1. On the other hand, where the function Cst(CS) is large (the degree of saturation for the referred segmented image pixel SegLE(i,j) is relatively high and no characteristics of the long-time exposure LE image remain), ST strongly trends to be set to 0.

The value the selection characteristic ST is determined at step S48. If the value of ST is equal to 1, the processing routine advances to step S49, and the pixel color data from SegLE(i,j) is stored in memory the area WDR(i,j). If the value of ST is equal to 0, the processing routine advances to step S50 and the color pixel data from SegSE(i,j) is stored in memory area WDR(i,j). It is thus possible to select between the SegLE and SegSE pixels for the (i,j) pixel in a random manner, while still taking account of the value of CS.

The image synthesis processing circuit 41 functions as image synthesizing means through the processes in steps S44 to S50.

When step 49 or step 50 is finished, it is determined whether the scanning throughout the whole segmented area information is finished or not (step S51). If the scanning is not finished, the processing routine returns to step S43 and next segmented area information is scanned. If it is determined that the scanning is finished, the wide dynamic range image information WDR(x,y) is outputted (step S52), and the processing routine ends.

By, selecting the segmented image information in view the color signal maximum value, it is possible to obtain an effect such that the area where the segmented area information is MIXData is displayed similarly to a state where the area is subjected to a dither process. A sense of incompatibility or discontinuity can be suppressed between the long-time exposure LE and the short-time exposure SE.

Although the case has been explained that the wide dynamic range image is obtained by using the image group comprising two images of the long-time exposed image and the short-time exposed image, it will be obviously understood that the wide dynamic range image can be also obtained by using images under a larger number of different exposing conditions.

Although there has been explained the example in which imaging processing according to the invention is applied to an electric camera, it should be understood that the invention is not limited to that application, but is applicable to a variety of image processing applications.

According to the first embodiment, by segmenting each of the plurality of images created under different exposure conditions into the properly exposed and improperly exposed areas and by correcting gradation of only the properly exposed areas, the contrast of the properly exposed areas can be improved.

The result is a wide dynamic range image in which good contrast is maintained throughout the wide range from the dark portion to the light portion synthesized from the properly exposed areas of the component images after gradation correction.

Further, the gradation is corrected so as to synthesize images near the central portion in the density range of the wide dynamic range image to be generated. Therefore, the image is easily visualized by efficiently using the density range.

In the gradation correcting circuit, the histogram is generated from the pixels near the edge component extracted by filtering, thereby generating the histogram in view of the features of the image.

The gradation correction characteristics are based on the histogram and are thus related to the features of the image. This allows the contrast of pixels near the feature component, and also simplifies the construction of the system.

In addition, the weighting upon generating the histogram is changed in accordance with the pixel position in the image. Consequently, the gradation can be properly corrected in consideration of the position of the main object to be photographed or the like.

In the image area segmenting circuit, the maximum value is detected from a plurality of color signals constructing the image signal of each image in the image group. The maximum value of the color signal is compared with a predetermined image signal level, thereby discriminating the properly exposed area (including the intermediate exposed area) and the improperly exposed area. The area in which the level of all of color signal is proper can be set to the properly exposed area. Accordingly, it is possible to improve the precision of the image area segmenting process.

FIGS. 10 to 15B show a second embodiment of the present invention. Here, portions similar to those in the first embodiment are denoted as the same reference numerals and the description is omitted. Only different points will be mainly mentioned.

A construction of an electric camera in the second embodiment is substantially same as that of the aboveexplained first embodiment.

Figure 10:
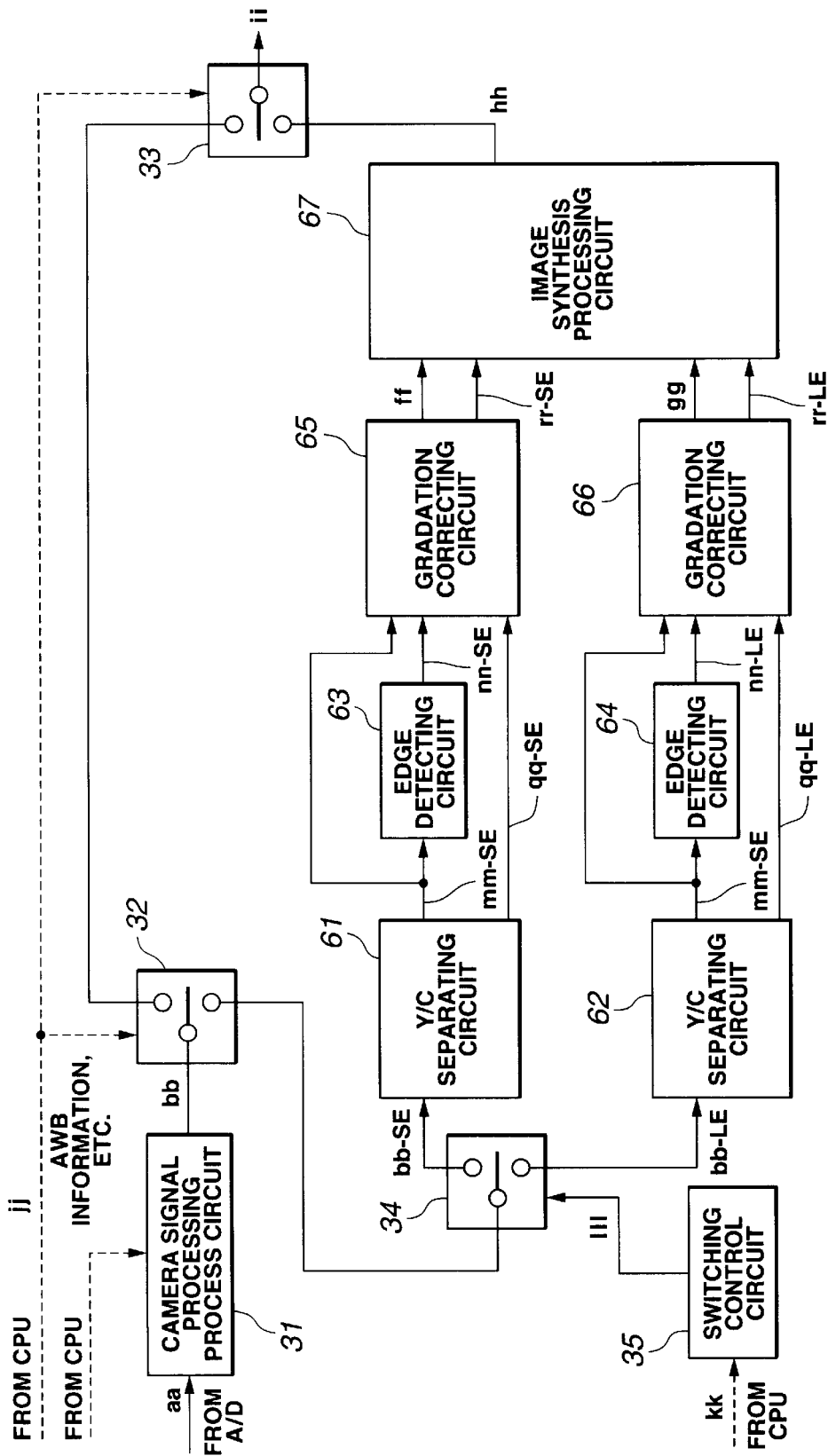
FIG. 10 is a block diagram showing a construction of a camera signal processing circuit according to the second embodiment of the present invention.

FIG. 10 is a block diagram showing construction of a camera signal processing circuit according to the second embodiment. Here, an image signal bb-SE representing a short-time exposure is provided from the switch 34 inputted to a Y/C separating circuit 61. An image signal bb-LE representing a long-time exposure LE is provided to a Y/C separating circuit 62.

The Y/C separating circuits 61 and 62 separate the image signals into a luminance signal Y (referred to as FIG. 12A) and color difference signals Cb and Cr on the basis of r-, g-, and b-components (R, G, and B) in the input image signal according to the following known relationships:

$$Y = 0.29900R + 0.58700G + 0.14400B \quad (3)$$

$$Cb = 0.16874R - 0.33126g + 0.50000B \quad (4)$$

$$Cr = 0.5000R - 0.41869G - 0.08131B \quad (5)$$

Among the above-mentioned separated signals, a luminance signal mm-SE representing the short-time exposure LE is inputted to a feature extracting circuit 63. A luminance signal mm-LE representing the long-time exposure LE is inputted to a feature extracting circuit 64. Circuits 63 and 64 may perform, for example, edge detection using a well-known quadric differential filter such as a Laplacian filter (refer to FIG. 12B). The quadric differential filter is used here, so that a detected result of a plus value and a detected result of a minus value (refer to FIG. 12C, which will be described later on) are outputted.

Gradation correcting circuit 66 receives as inputs the mm-SE and qq-SE outputs of Y/C separating circuit 61 and the nn-SE output of edge detecting circuit 63. Similarly, gradation correcting circuit 65 receives as inputs the mm-LE and qq-LE outputs of Y/C separating circuit 62 and the nn-LE output of edge detecting circuit 64.

Figure 11:
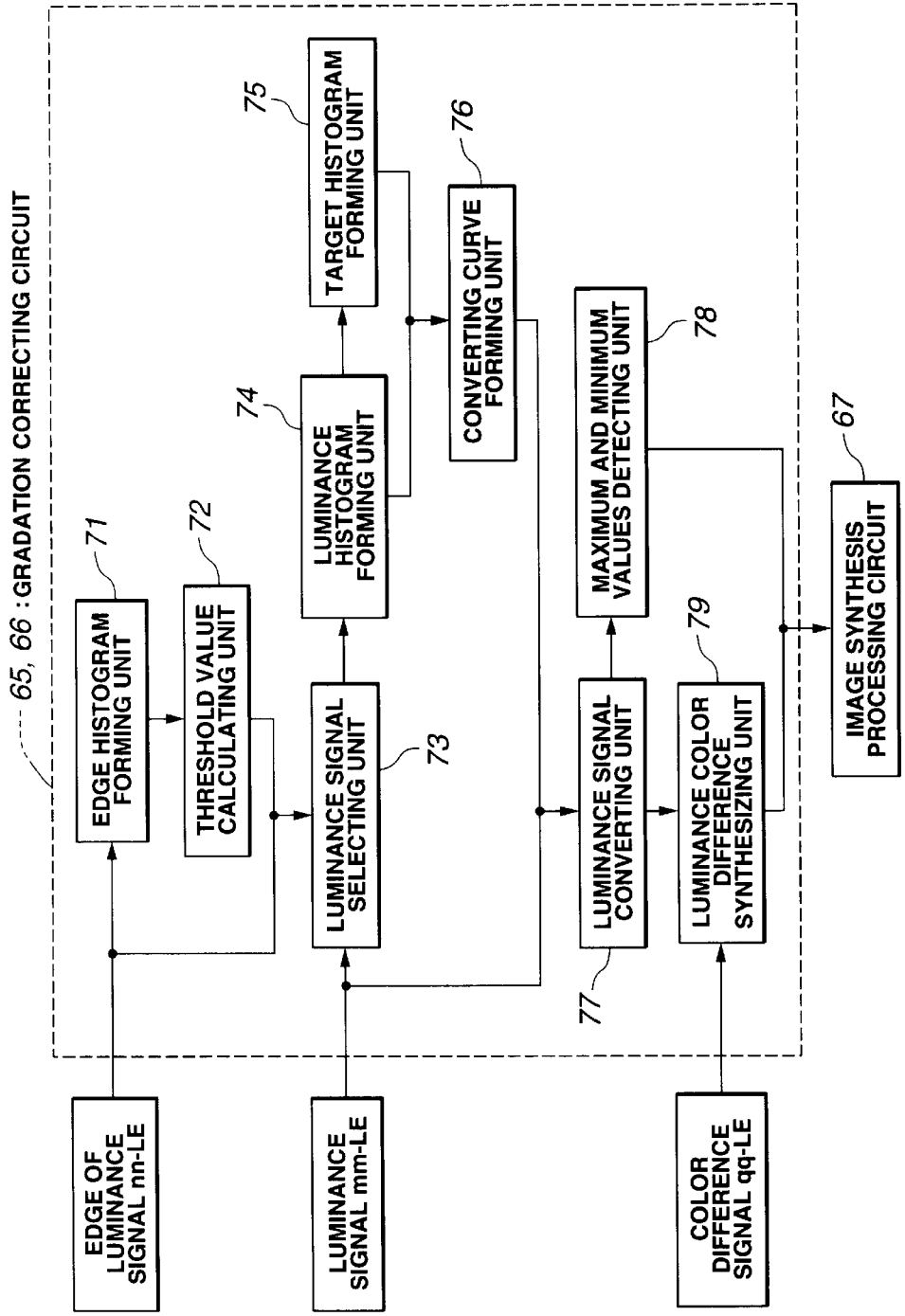
FIG. 11 is a block diagram showing a construction of a gradation correcting circuit according to the second embodiment.

FIG. 11 is a block diagram showing construction of gradation correcting circuits 65 and 66. Only long-time exposure correcting circuit 66 will be mainly described.

The edge information signal nn-LE based on the luminance signal mm-LE is inputted to an edge histogram forming unit 71, which generates an edge histogram indicative of the pixel luminance distribution as a function of the luminance levels of the edge information signal nn-LE. This histogram is different from the histogram in the first embodiment and is a histogram of an edge component of the luminance signal itself.

Figure 12A:
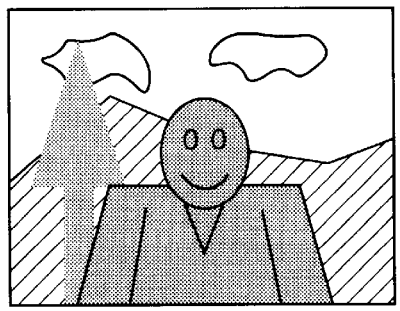
FIGS. 12A, 12B, 12C, 12D, 12E, and 12F are diagrams showing graphs and the like in processes upon forming a luminance histogram, a target histogram, and a converting curve from edges of luminance signals according to the second embodiment.
Figure 12B:
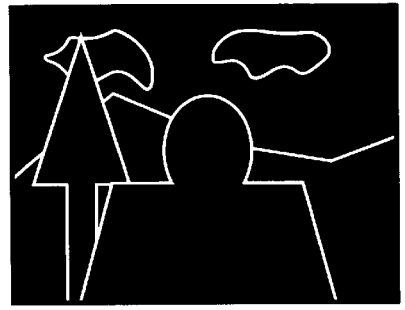
Figure 12C:
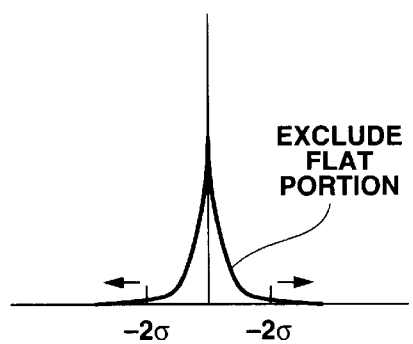

In a general natural image, the edge histogram is modeled by a Gaussian distribution. Such a histogram is shown in FIG. 12C.

The edge histogram formed by the edge histogram forming unit 71 is inputted to a threshold value calculating unit 72. This calculates a standard deviation σ of the edge histogram, which is doubled, and threshold values of ±2σ are established.

The threshold value signals outputted from threshold value calculating unit 72, the edge information signals nn-LE and the luminance signal mm-LE are provided to a luminance selecting unit 73 which serves to select a target pixel having luminance greater than the threshold value +2σ or smaller than the threshold value −2σ within the edge component of the luminance signal.

As explained above, the threshold value is determined on the basis of the standard deviation σ of the edge histogram, thereby reliably extracting only an edge portion irrespective of the exposure conditions, i.e., brightness.

Figure 12D:
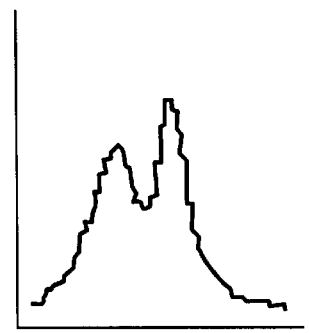

A luminance histogram forming unit 74 generates a luminance histogram as shown, for example, FIG. 12D on the basis of a luminance signal of the extracted effective, i.e., the one exhibiting dominant sharpness. The luminance histogram signal is provided to a target histogram forming unit 75. This provides a distribution model by converting the luminance histogram into a histogram in a Gaussian format.

In other words, in the first embodiment, a high-contrast image is generated by smoothing the histogram. In the second embodiment, however, the histogram in the Gaussian format is a further higher-contrast image.

The degree to which the converted luminance histogram conforms to the Gaussian format to the histogram might be different depending on each image. Therefore, it is necessary to set the optimum degree of the Gaussian format adaptively. This is accomplished by convolving the luminance histogram using a Gaussian kernel, i.e., the Normal probability density function.

Figure 12E:
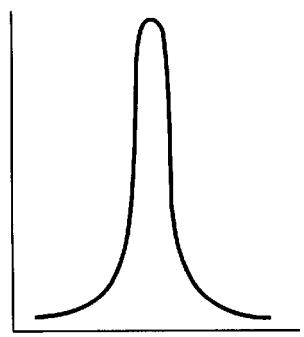

Specifically, conversion of the luminance histogram O(L) to a Gaussian histogram T(L) calculated according to the relationship:

$$T(L) = O(L) * \frac{1}{\sqrt{2\pi} \, k} e^{-\frac{L^2}{2k^2}} \quad (6)$$

Where the symbol "*" denotes a convolution, "L" denotes the level of the luminance signal and "k" denotes a constant which adjusts the degree of conformity to the Gaussian format. In the second embodiment, for example, "k" is set to be between about one to two times the standard deviation of the luminance histogram O(L). This results in a target histogram such as shown in FIG. 12E.

As mentioned above, the target histogram is generated adaptively for every inputted image and, therefore, it is possible to flexibly cope with a variety of images.

A converting curve forming unit 76, which receives as inputs, the target histogram signal and the luminance histogram signal, generates a gradation converting curve to convert the luminance histogram into the target histogram.

Figure 12F:
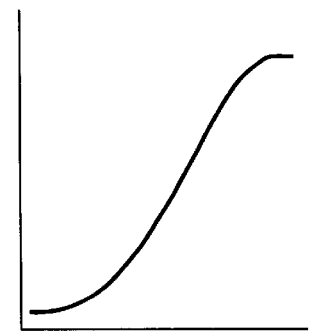

This as shown in FIG. 12F. A luminance signal converting unit 77, serving as gradation correcting means, processes the luminance signal on the basis of the gradation converting curve.

A luminance color difference synthesizing unit 79 receives the gradation-corrected luminance signal from luminance signal converting unit 77 and the color difference signal qq-LE and generates individual R, G and B pixel luminance signals according to the relationships:

$$R=Y+1.40200Cr \quad (7)$$

$$G=Y-0.34414Cb-0.71417Cr \quad (8)$$

$$B=Y+1.772000b \quad (9)$$

Also, a maximum and minimum values detecting unit 78 detects a maximum value (LE-YMAX) and a minimum value (LE-YMIN) of the gradation-corrected luminance signal from the luminance signal converting unit 77. The detected results ("rr-LE" in FIG. 10 in case of the long-time exposure and "rr-SE" in FIG. 10 in case of the short-time exposure) are outputted to the image synthesis processing circuit 67.

Figure 13:
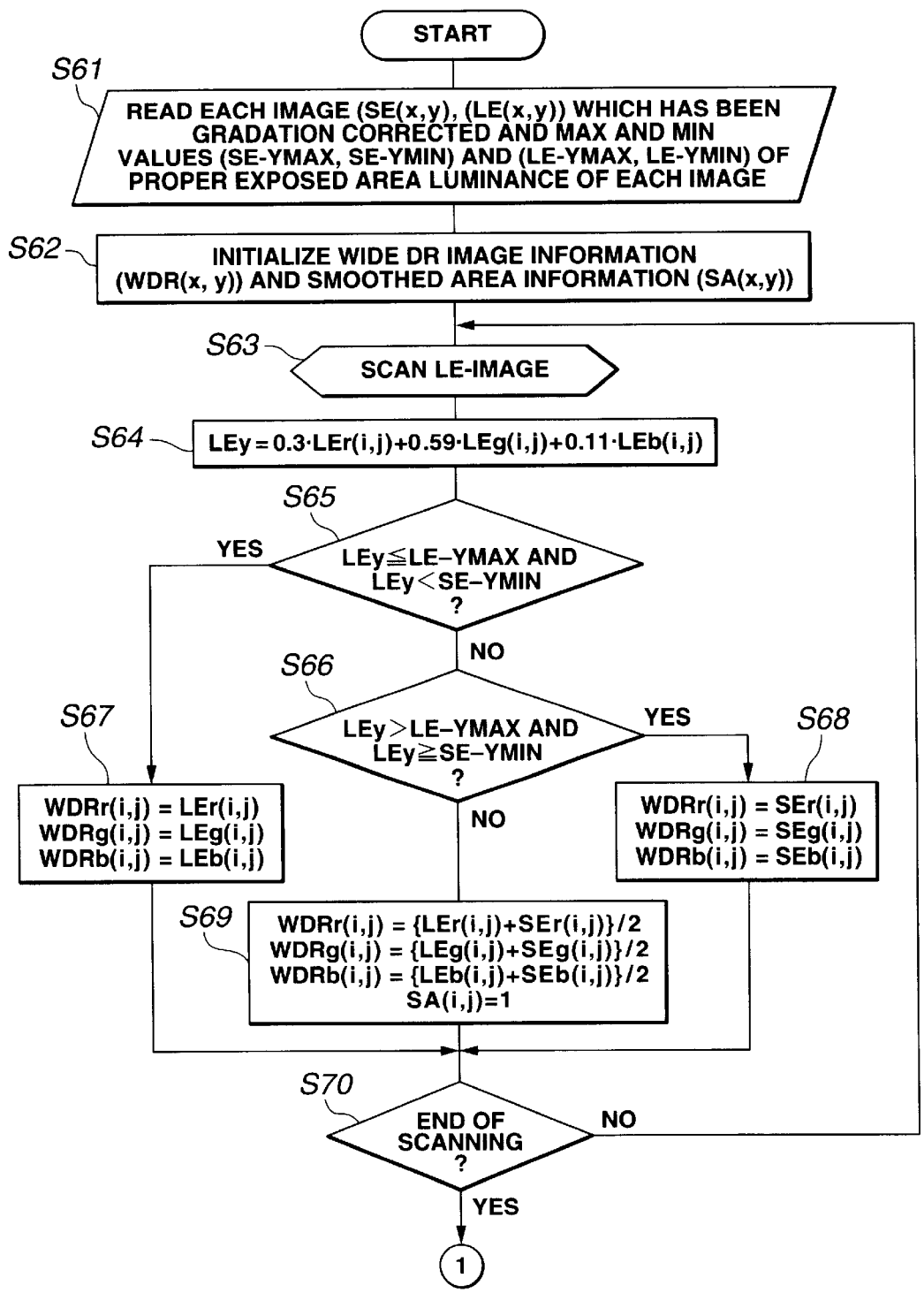
FIG. 13 is a flowchart showing one part of a process in the image synthesis processing circuit according to the second embodiment.
Figure 14:
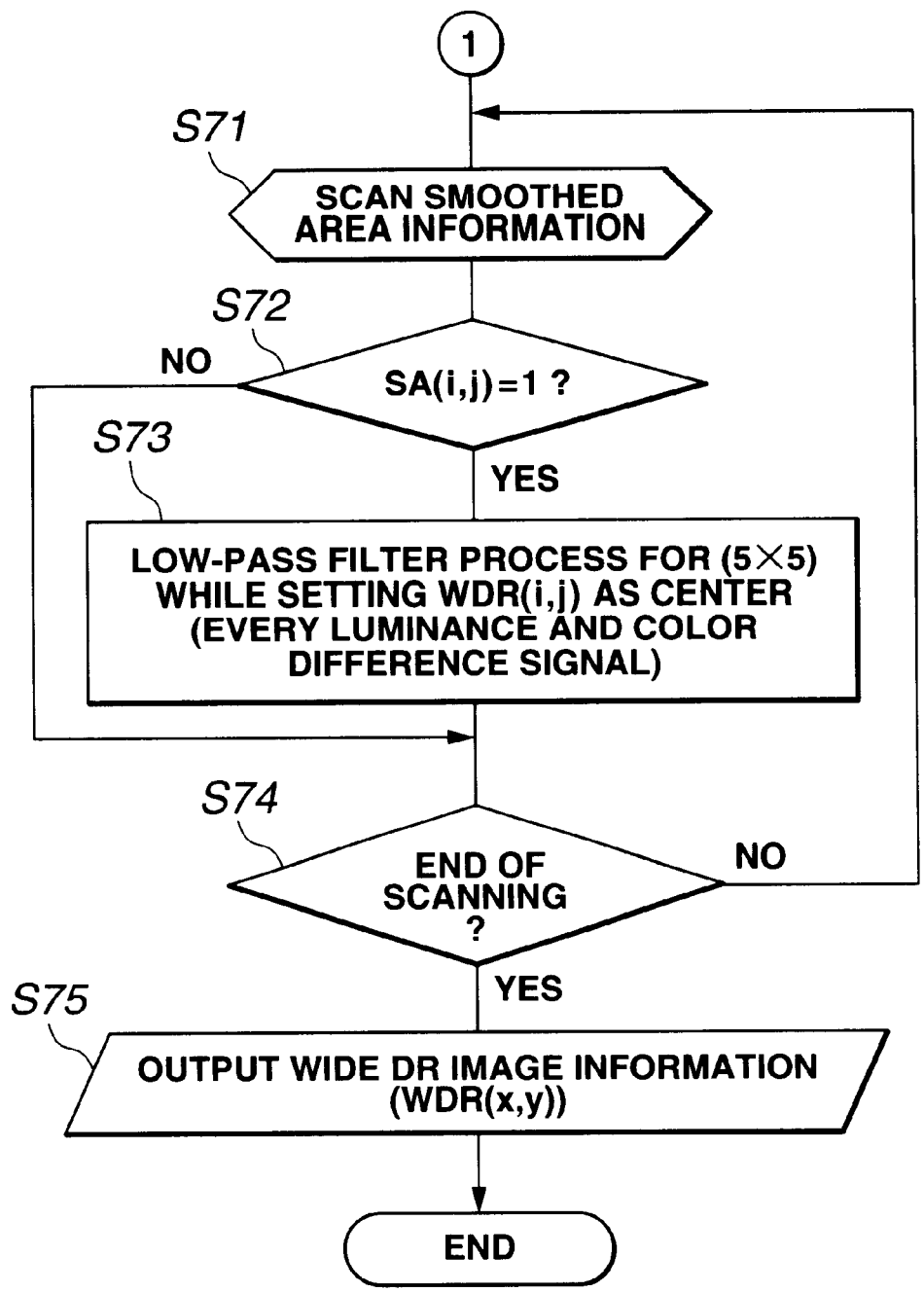
FIG. 14 is a flowchart showing the other part of a process in the image synthesis processing circuit according to the second embodiment.

FIGS. 13 and 14 are flowcharts showing the image synthesis processing performed by circuit 67. Referring first to FIG. 13, the first operation is to read the gradation-corrected image information SE(x,y) and LE(x,y) which is outputted from the gradation correcting circuits 65 and 66 and the maximum value information and the minimum value information (SE-YMAX, SE-YMIN) (LE-YMAX, LEYMIN) of the proper exposed area luminance comprising the luminance signals which have been selected by the luminance signal selecting unit 73 and gradation-corrected (step S61).

After that, the memory area WDR(x,y) to store the wide dynamic range image information and a memory area SA(x,y) to store smoothed area information to discriminate whether a smoothing process is executed in the following steps or not are initialized (step S62). Then, the LE-image information is scanned (step S63).

Next, at step S64, a luminance signal LEy is formed on the basis of pixel color components LEr(i,j), LEg(i,j), and LEb(i,j) according to the relationship:

$$LEy=0.3LEr(i,j)+0.59LEg(i,j)+0.11LEb(i,j) \quad (10)$$

Then, it is determined whether the value LEy is less than or equal to the value LE-YMAX, and less than the value SE-YMIN (step S65). If both conditions are satisfied in step S65, the LE(i,j) color pixel data are stored in memory area WDR (i,j) (step S67).

If at least one of the conditions is not satisfied in step S65, it is next determined whether the value LEy is greater than the value LE-YMAX and is greater than or equal to the value SE-YMIN (step S66). If both conditions are satisfied in step S66, the SE(i,j) color pixel data are stored in memory area WDR (I,j) (step S68).

The image synthesis processing circuit 67 thus functions to select properly exposed pixels through steps S65 to S68.

If at least one of the conditions is not satisfied in step S66, an average value of the LE(i,j) and SE(I,j) color pixel data is stored in memory area WDR(i,j) and "1" is stored in the smoothed area information memory area SA(i,j) to indicate whether a low-pass filter process, which will be explained later on, is to be performed (step S69). Thus, in step S69, the image synthesis processing circuit 67 functions as weighting and averaging means.

In step S70, it is determined if scanning the whole picture plane is finished. If scanning is not finished, the processing routine returns to step S63 and a next pixel is scanned. Referring now to FIG. 14, if it is determined that the scanning is finished, the smoothed area information of each pixel is scanned (step S71).

At step S72, the value of the smoothed area information SA(i,j) is determined. If the smoothed area for the (i,j) pixel is equal to 1, a predetermined pixel area, for example, a 5×5 pixel area surrounding the 9(i,j) pixel, is subjected to the low-pass filtering process, which is applied to each pixel luminance signal and color difference signal within the area (step S73). Step S73 thus functions as a smoothing means.

If the smoothed area information SA(i,j), i.e., if the (i,j) pixel is not equal to 1 in step S72, the operation in step S73 is skipped.

Step S74 determines whether the scanning throughout all pixels is finished or not. If the scanning is not finished, the processing routine returns to step S71 and the scanning is performed again. If it is finished, the wide dynamic range image information WDR(x,y) is outputted (step S75) and the processing routine ends.

Figure 15:
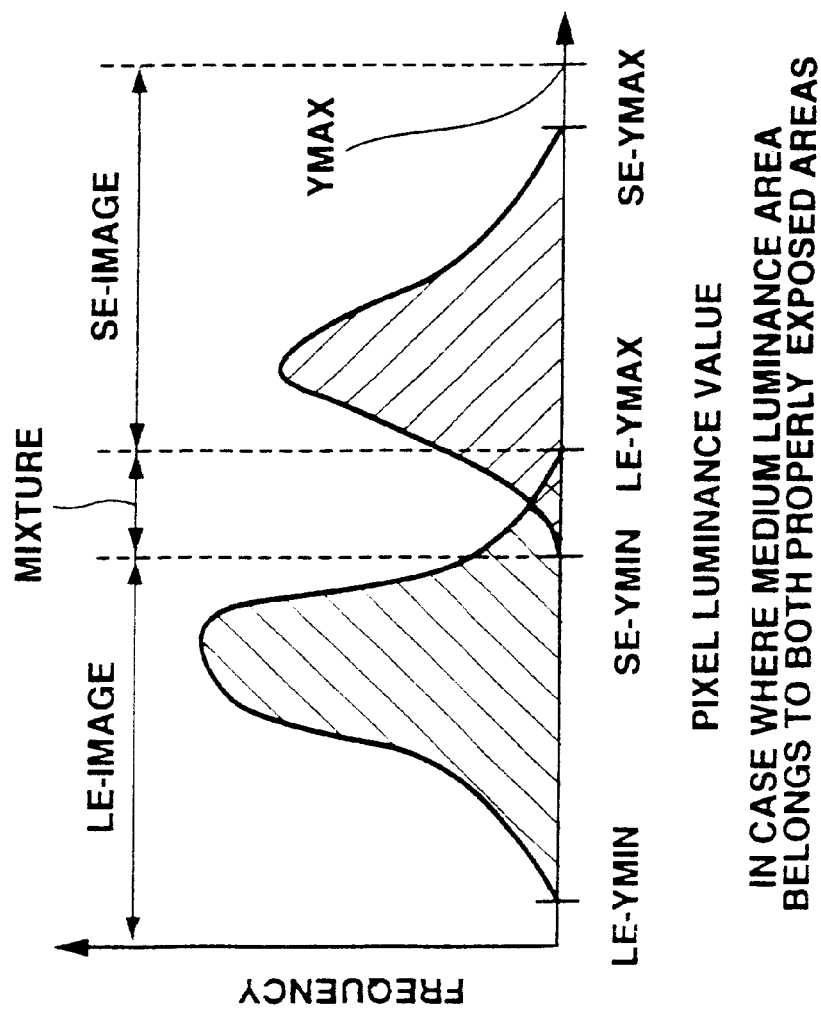
FIG. 15 is a diagram showing an image synthesizing model in the case where a medium luminance area belongs to both properly exposed areas.
Figure 16:
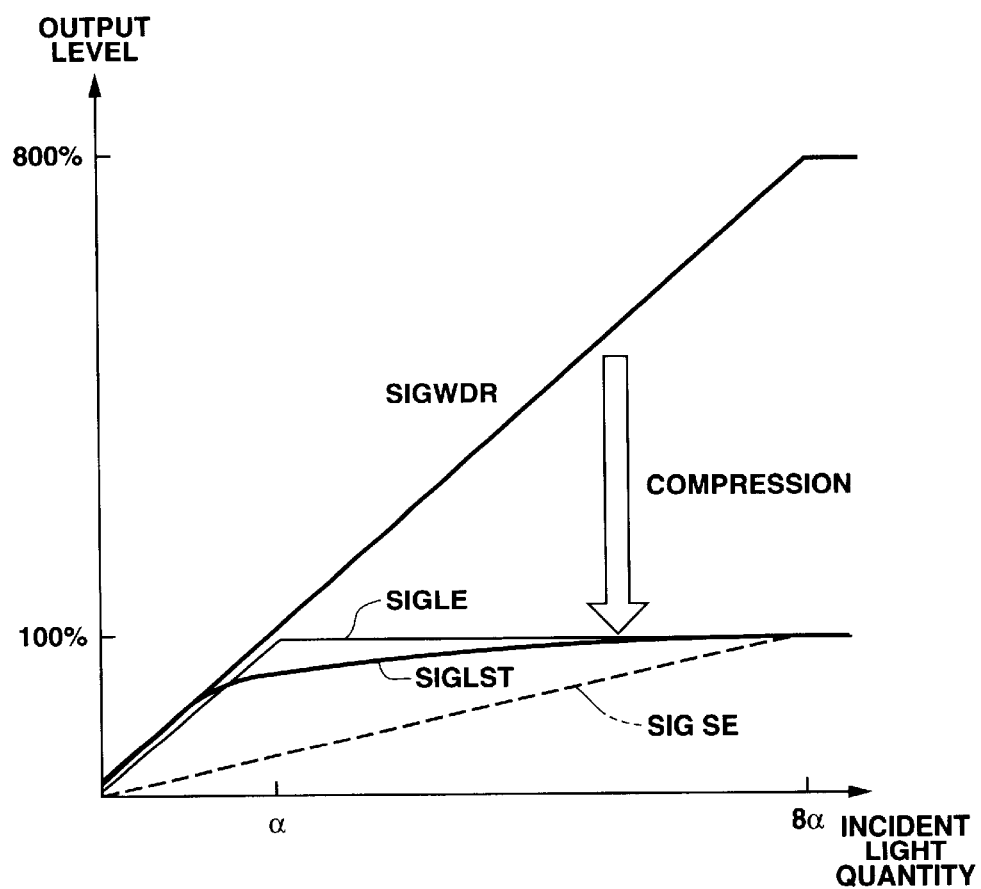
FIG. 16 is a graph showing a state of a process for conventionally forming and compressing a wide dynamic range image signal.

FIG. 15 shows a histogram in which the luminance values of the LE-image and the SE-image overlap. For this case, a pixel having a luminance value in the overlapping range between SE-YMIN and LE-YMAX would be considered properly exposed in both the LE- and SE- images, and the corresponding pixel luminance for the composite synthesized image is determined by averaging the luminance values for the LE- and SE- images. For pixels having luminance values less than the lower boundary of the overlapping range, the luminance value of the LE-image is used in the synthesized image, while for pixels having luminance values exceeding the higher boundary of the overlapping range, the luminance value of the SE-image is used.

Of course, for a pixel darker than LE-YMIN, the long-time exposure pixel value is used. With respect to a pixel lighter than SE-YMAX, the short-time exposure pixel value is used. Therefore, when a pixel does not lie within the proper exposed range, a pixel which is nearer the proper exposure is selected.

When a plurality of properly exposed areas are combined to produce the composite wide dynamic range image as explained above, there may be a defect area which is improperly exposed in all of the images. The non-overlapping histograms shown in FIG. 15 represent this condition. To compensate for this, for an overexposed image area, the pixel value from the image having minimum exposure is used in the composite image. Conversely, for an under exposed image area, the pixel value from the image having maximum exposure is used in the composite image. The image synthesizer 67 thus functions to adjust the image brightness to cover the defect area.

Referring again to FIG. 10, the synthesized wide dynamic range image data 11 are outputted via the switch 33. The second embodiment is capable of producing substantially the same effects as the first embodiment and, also, of improving the contrast of each image by separately executing the gradation correcting process for each of the plurality of images.

By synthesizing the images which have been gradation-corrected in order to generate the wide dynamic range image, it is possible to obtain the wide dynamic range image in the state where the contrast is held throughout the wide range from the dark portion to the light portion.

Further, the gradation correcting circuit generates the histogram concerned with the edge portion by filtering and selects the target pixel to use in generation of the gradation correcting characteristics from the distributing state, thereby enabling the pixel with a feature as the properly exposed pixels of important image areas to be selected.

The histogram of the target pixel is generated and the conversion for modeling the generated histogram to a prescribed distribution is set to the gradation correcting characteristics, thereby enabling the contrast of an important portion in each image to be improved.

Additionally, when there area plurality of image signals for the same pixel which have been gradationcorrected, the image synthesis processing circuit weights and averages image signals, thereby enabling the image signals to be equally handled. Moreover, the weighted and averaged pixel is subjected to the smoothing process, thereby enabling a sense of incompatibility felt between the weighted and averaged image signal and the non-(weighted and averaged) image signal to be minimally suppressed.

The image synthesis processing circuit checks each image which has been gradation-corrected at every pixel position and selects the pixel near the proper exposure in the image group, thereby excluding the improperly exposed pixels and enabling only the pixel which is nearer the proper exposure to be used to the wide dynamic range image.

Further, when there is a defect area upon synthesizing the proper exposed areas and generating the wide dynamic range image, the image synthesis processing circuit covers the defect area by using the relevant area of the minimum exposed image in the image group in the case where the defect area is over-exposed and by using the relevant area of the maximum exposed image in the image group in the case where the defect area is under-exposed. Thus, it is able to correct the defect area by the proper information in the image group, thereby enabling the sense of incompatibility in the defect area to be minimally suppressed.

In this invention, it is apparent that working modes different in a wide range can be formed on this basis of this invention without departing from the spirit and scope of the invention. This invention is not restricted by any specific embodiment except being limited by the appended claims.

What is claimed is:

1. An image processing apparatus for generating a wide dynamic range image by processing a plurality of images photographed under different exposure conditions, the apparatus being comprised of:
    image correcting circuitry to correct a gradation of the images photographed under different exposure conditions; and
    an image synthesizer to combine the gradation-corrected images into a the wide dynamic range image.

2. An apparatus according to claim 1, wherein the image correcting circuitry is operable to adjust the gradation of each of the plurality of images so that the combined wide dynamic range image is approximately in a density range of the plurality of images.

3. An apparatus according to claim 1, wherein the image correcting circuitry includes
    feature extracting circuitry operable to extract image feature components by filtering image signals respectively assigned to the plurality of images;
    histogram generating circuitry operable to generate histograms from pixels of the images near the image feature components extracted by the feature extracting circuitry;
    gradation correction characteristic generating circuitry operable to generate gradation correcting characteristics in accordance with the histograms generated by the histogram generating circuitry; and
    gradation correcting circuitry operable to correct the graduation of the images in accordance with the gradation correction characteristics generated by the gradation correction characteristic generating circuitry.

4. An apparatus according to claim 3, wherein the histogram generating circuitry changes a weighting of the pixels of the images as a function of positions of the pixels of the image.

5. An apparatus according to claim 1, wherein the image correcting circuitry is comprised of:
    feature extracting circuitry operable to extract image feature components of the images by filtering image signals respectively assigned to the plurality of images;
    feature component histogram generating circuitry operable to generate feature component histograms for the feature components extracted by the feature extracting circuit company;
    threshold value calculating circuitry operable to calculate threshold pixel luminance values from the feature component histograms;
    target pixel selection circuitry operable to select target pixels from the image signals in accordance with the threshold pixel luminance values calculated by the threshold value calculating circuitry;
    histogram generating circuitry operable to generate target pixel histograms from the target pixels selected by the target pixel selection circuitry;
    distribution modeling circuitry operable to adjust the histograms generated by the histogram generating circuitry to a predetermined distribution to produce adjusted histograms;
    gradation correction characteristic generating circuitry operable to generate gradation correcting characteristics in accordance with the target pixel histograms and the adjusted histograms; and
    gradation correcting circuitry operable to correct the graduation of the images in accordance with the gradation correction characteristics.

6. An apparatus according to claim 1, wherein the image synthesizing circuit includes:
    weighting and averaging circuitry operable to calculate a weighting-average of luminance values of the pixels for a particular image pixel position when more than one luminance value has been produced for the pixel position by the image correcting circuitry; and
    smoothing circuitry operable to smooth the luminance values of the pixels calculated by the weighting and averaging circuitry.

7. An apparatus according to claim 1, wherein the image synthesizer includes a selection circuit operable to select a pixel having an approximately proper exposure for each pixel position of the wide dynamic range image from among the pixels of each of the plurality of gradation-corrected images.

8. An apparatus according to claim 1, wherein the image synthesizer includes an area adjusting circuit operable to compensate for a defect area in the synthesized wide dynamic range image characterized by an area which is improperly exposed in each of the plurality of images, the area adjusting circuit being operative to select a luminance value for a pixel position in the defect area from the image of the plurality of images having a minimum exposure when the pixel position is over-exposed, and to select a luminance value for a pixel position in the defect area from the image of the plurality of images having a maximum exposure when the pixel position is under-exposed.

* * * * *